United States Patent Office 2,793,195
Patented May 21, 1957

2,793,195

PROCESS FOR PREPARING PIGMENTED ORGANIC PLASTICS

Vincent C. Vesce, Smoke Rise, Kinnelon, N. J., assignor to The B. F. Goodrich Company, New York, N. Y., a corporation of New York No Drawing. Application June 2, 1953,
Serial No. 359,224

The portion of the term of the patent subsequent to August 18, 1970, has been disclaimed and dedicated to the Public 9 Claims. (Cl. 260—29.6)

This invention relates to pigmented compositions and more particularly relates to the production of pigmented compositions of matter suitable for the coloring of solid organic plastics.

Heretofore, it has been necessary, in the production of color master batches of organic plastics, to submit the pigment and the plastic along with other materials such as plasticizers, to prolonged and expensive mechanical working to achieve a dispersion of usable quality. In such prior processes, the milling times are considerable, the power requirements for such equipment are very high, the constant attendance of skilled labor is required and the degree of dispersion obtained by these methods leaves much to be desired when a very fine degree of dispersion is required.

Other major disadvantages in prior processes of making color master batches lie in the product itself, which generally is of extremely hard character and of relatively difficult solubility due to the unavoidable heating of the plastic in the milling operation, and further, the chromaticity of the pigmented product is low, all due to the conditions obtained in the drastic milling operations. A still further and more serious objection to prior products is the fact that they almost always contain a large amount of plasticizer or softener necessary for proper mill operation which may be undesirable and actually harmful in the final product to be pigmented.

By means of this invention, color master batches of extremely high quality can be prepared in an efficient manner with simple inexpensive milling of a solid pigment and a solid organic plastic by the use of a novel liquid grinding medium which later can be easily removed and even reused, if desired, for new batches. After the removal of the liquid grinding medium, the dispersion may then be dried and ground.

The dispersions formed in accord with this invention are stable, uniform and substantially free from agglomerates and undesired addition products, such as plasticizers. They have a high chromaticity and when used to color plastic masses the full strength of the pigment employed is realized. The product is soft and can easily be reduced to a very fine powdery consistency. Yarn and filaments extruded from plastic compositions colored by these materials are not only highly colored and completely uniform but the small particle size or fineness of the dispersion is such that the tensile strength of the yarn or monofilament produced is not affected.

This invention accomplishes the following objects: the production of pigmented compositions, or master color batches which require only simple, inexpensive milling in preparation; the production of pigmented organic plastics, containing coloring materials in a state of extremely fine and uniform dispersion, having a high chromaticity; and the production of uniform and fine dispersions of colorants in organic plastics in the form of a dry, free-flowing powder which is easily incorporated into a larger mass of the same or similar plastic to give a uniformly colored plastic mass, which plastic mass can then be spun, extruded, molded or treated in any of the many ways known to those versed in the art of manipulating such materials for the production of uniformly and strongly colored yarns, filaments, films, lacquers, and similar products.

In practicing the present invention there is placed in a ball, pebble, or colloid mill a mixture consisting of the solid organic plastic to be pigmented, the specific pigment desired, and the novel liquid grinding medium comprising an intimate admixture of water, a liquid organic water-miscible solvent for the plastic to be pigmented, and a minor portion of a liquid organic water-immiscible solvent for the plastic. The balls or pebbles are added and the mill allowed to grind the mixture until a dispersion of the desired degree is obtained. Preferably, both the plastic and the pigment are in particulate or powder form when added to the mill.

A method for attaining a superior dispersion of pigment in solid organic plastic is disclosed in my copending application Serial No. 108,423, filed August 3, 1949, which issued as U. S. Patent No. 2,649,382 on August 18, 1953, of which this application is a continuation-in-part, wherein the liquid grinding medium consists essentially of water and a water-miscible solvent for the plastic, and that method is preferable for the pigmentation of many plastics. However, in the case of plastics that are more difficultly soluble, and where shorter milling times are desirable, as to minimize harmful side reactions during the milling operation, it is preferred to use a liquid grinding medium differing from that of my earlier application and containing not only water and water-miscible solvent for the plastic but also a minor proportion of a water-immiscible solvent for the plastic. No theory is here presented as to how the water-immiscible solvent functions to obtain the more speedy pigmentation of plastic, but apparently the water-immiscible solvent is wholly or in part soluble in the water-miscible solvent and when the three liquids, i. e., water, water-miscible solvent and water-immiscible solvent, are thoroughly intermixed, a uniform dispersion of the three liquids results such that the liquid grinding medium acts as a single medium in rendering the plastic particles "pigment receptive," without substantially dissolving the plastic and without causing substantial gelling or agglomeration of the plastic. This application may be considered to be a continuation-in-part of my earlier application above identified.

Any solid organic plastic may be pigmented by the process of this application as long as it is substantially insoluble in water. Many solid organic plastics, but by no means all such plastics, are enumerated and classified in Mattiello's "Protective and Decorative Coatings," published by J. Wiley & Co. (1946), vol. 5, chapter 1, pages 2 et seq. Such plastics include natural resins and modified natural resins; alkyd resins, both modified and unmodified types; aldehyde condensation products; vinyl resins; rubber and rubber-like synthetics; hydrocarbon resins; and associated materials such as waxes, etc. The plastic materials which are embodied in the examples of the specification as illustrative of the invention of this application are organic plastics of normally solid structure, substantially insoluble in water and at least partially soluble in a liquid organic solvent which is miscible with water. Such plastics are hereinafter referred to as "solid organic plastics."

Some of the solid organic plastics referred to in the preceding paragraph as falling within the scope of the invention of this application are enumerated in chapter 1, volume 5, of Mattiello and include:

1. Plastics which are polymers or copolymers of ethylene, isobutene, vinyl chloride, vinylidene chloride, chloroprene, vinyl acetate, vinyl acetal, acrylic acid, methacrylic acid, methyl and ethyl acrylate, methyl and ethyl methacrylate. Monomers of the types listed above are herein called "vinyl monomers" and the polymers and copolymers of these vinyl monomers are in the specification and the claims of this application referred to as "vinyl resins."

2. Plastics formed by the reaction between a polyhydroxy alcohol and a polybasic acid to form a synthetic plastic resin, known as an alkyd resin. The polybasic acids include phthalic, fumaric, maleic, succinic, sebacic and adipic acids, and the like, and also adduct acids such as rosin-maleic, terpene-maleic acids and the like. The polyhydroxy alcohols include glycerol, the glycols, penta- and dipentaerythritol and unsaturated alcohols such as allyl alcohol and methallyl alcohol. Well known alkyd resins are glycerol phthalate, ethylene glycol phthalate, glycol succinate, glycol maleate, glycol fumarate, glycerol rosin-maleate. Modified alkyd resins are produced by introducing into the reaction mixture of a polyhydroxy alcohol and a polybasic acid a third ingredient, called a modifier, including acids from drying oils, such as linoleic acid, rosin, Congo copal, phenol and phenolic-aldehyde resins, such as phenol-formaldehyde condensation products. Among these are rosin modified glycerol phthalate, phenolic modified glycerol phthalate, linoleic modified glycerol maleate and the like. Resins of the type enumerated in this paragraph are herein referred to as "alkyd resins."

3. Plastics which are classified under the generic term "wax" and are so referred to in the specification and claims of this application, include natural waxes and synthetic waxes. Some of the better known natural waxes are beeswax, Chinese wax, candelilla wax, carnauba wax, Japan wax, montan wax, ozocerite wax, ceresin wax, paraffin wax and spermaceti wax. The synthetic waxes include hydrogenated oils, such as stearic acid, the chlorinated diphenyls and the chlorinated naphthalenes, known as arochlor and halowax.

4. Plastics known as cellulose resins, and comprising cellulose nitrate, cellulose acetate, cellulose acetopropionate, cellulose acetobutyrate, methyl cellulose, ethyl cellulose, hydroxyethyl cellulose, and the like, all of which are well known chemical compounds and are herein collectively referred to in the specification and claims of this application as cellulose resins.

5. Plastics which are natural or modified natural resins. Some of the best known natural resins are rosin, dammar, copal, mastic, shellac and the like. The modified natural resins include esters of rosin acids, rosin soaps, such as potassium resinate, and rosin adducts, such as rosin maleate, and the like. These plastic resins are herein collectively referred to in the specification and claims of this application as "natural resins."

As pigment, one may employ any of the solid colorants normally used in the industry for the coloring, opacifying, delustering or otherwise modifying the color of the solid organic plastic. These include the inorganic prime pigments, organic prime pigments, various inert or extender pigments, metallic pigments and the various bone and gas blacks, such as disclosed in Mattiello "Protective and Decorative Coatings," vol. 2, chapter 1 (1942), or the Journal of the Society of Dyers and Colorists, vol. 61 (307), December 1945.

As an essential feature of the invention, the solid organic plastic and pigment are mixed with a liquid grinding medium comprising water, a liquid organic water-miscible solvent for the plastic and a minor portion of a liquid organic water-immiscible solvent for the plastic. It is important that the mixture of water and solvents be present in such proportions in the liquid grinding medium that, during the time of processing, the mixture of liquid organic solvents and water does not dissolve a substantial amount of the solid organic plastic or cause substantial gelling or agglomeration of the plastic.

To accurately find the point at which the liquid grinding medium composed of the liquid organic solvents and water becomes substantially a non-solvent for the plastic, a series of tests are made comprising the selected solvents and water in various percentages. The liquid grinding medium may vary in the percentages of the solvents to be employed in small increments depending upon the precision desired. Thus, as an example, one may fill a number of bottles with a liquid grinding medium varying from 10% to 90% water by weight, the solvents comprising the remainder of the liquid grinding medium are added with varying proportions of the two solvents. A small amount of the plastic is then added to each bottle, preferably in the physical form in which it is to be used and in an amount of about 1 part of plastic to 4 parts of liquid grinding medium by weight. The mixture is well agitated and the plastic is then permitted to settle.

One may note that in one or more of the bottles the plastic either goes completely into solution or clumps or agglomerates into a more or less translucent, gel-like mass. It will also be noted that in the remaining bottles, the plastic retains a discrete particle appearance. While these effects can generally be observed almost immediately, it is better to permit about 4 hours of contact before comparisons are made and still more preferably one may allow as much time for contact as is to be given during the actual pigment dispersion operation.

The action of the mixture of water and liquid organic solvents on the plastic when it is less drastic than that which causes a gelling and agglomeration of the plastic and yet contains sufficient solvent to make the plastic receptive to pigment dispersion can best be termed a "pigment receptive action" on the plastic.

The most desirable and optimum proportions of constituents in the liquid grinding medium has been found to be the one having that proportion of water and solvents just sufficient to prevent the above-mentioned agglomeration of the plastic, and yet have enough of the solvents present to attack the plastic and make it receptive to the entrance and dispersion of pigment. It should be clearly understood, however, that for operability there is no precise percentage of the solvents and water or any precise point where the liquid grinding medium imparts the receptive quality to the plastic but, rather, a range which may vary from about 2 or 3 percent—in the case of particular solvents and particular plastics—to as much as about 90% with other solvents and plastics. The indication that the amount of solvent is "approximately" below that which results in gelling or agglomeration is intended to cover that range where the pigment receptive action on the plastic takes place.

The amount of liquid grinding medium comprising liquid organic solvents and water, used in the process, is selected by the operator to be sufficient to give fluidity to the solids in the particular mill used in the process. A mill with flint pebbles, for example, will generally require more liquid grinding medium than one using steel balls. It is, of course, obvious that one may, if so desired, use other types of mills for the grinding operation.

The liquid organic water-miscible solvents which will solubilize the solid organic plastics are many and are generally well-known, and include the alcohols, as, for example, methyl, ethyl, iso-propyl alcohol, diacetone alcohol, etc.; dioxane; the glycol ethers as, for example, the Cellosolves and the Carbitols; the esters such as the Cellosolve acetates and methyl or ethyl lactate; the ketones such as acetone, methyl-ethyl ketone; and other solvents or mixture of solvents for the plastics well-known to the art.

The liquid organic water-immiscible solvents useful in this invention are also numerous and well-known. Such solvents as xylol and monochlor benzene have been found to be especially effective in connection with vinyl plastics.

For a better understanding of the invention, the following examples are given, it being clearly understood that these are merely by way of illustration and not to be considered limitative of the invention. References to the pigments employed utilize the generally accepted trade names. The letter "M" with figure and page number following the name refers to the figures and pages in vol. 5 of J. J. Mattiello's "Protective and Decorative Coatings" which gives the chemical composition. The designation "C. I." refers to the well-known Colour Index published by the Society of Dyers & Colourists.

Unless otherwise noted, all percentages are to be considered as being on a weight basis.

Example 1

A one-gallon porcelain pebble mill is charged with a liquid grinding medium consisting of 910 grams of water, 390 grams of acetone, a water-miscible solvent, and 200 grams of monochlor benzene, a water-immiscible solvent. The constituents of the liquid grinding medium are thoroughly mixed, the monochlor benzene being dispersed throughout the liquid grinding medium. To this mixture is added 100 grams of lamp black and 200 grams of powdered polyacrylonitrile, such as marketed by Du Pont under the trade name Orlon. About 7 lbs. of #00 French flint pebbles are added. After milling for about 16 hours, the mill is discharged and rinsed out with water. The product and rinse water are collected and filtered. The filter cake is then washed, dried and pulverized. One obtains about 287 grams of a fine, soft, deep black powder.

Other solid organic polymers and copolymers of ethylene and its derivatives may be substituted for the polyacrylonitrile in the above Example 1, such as polyethylene, polyisobutylene, polyvinyl chloride, polyvinyl acetate, polystyrene, polyvinyl carbozole, polymethyl acrylate, polyvinylidene chloride, polyvinylidene acetate, polymethyl methacrylate and the like polymers of ethylene derivatives, as well as the copolymers of any two of the monomers vinyl chloride, vinylidene chloride, vinyl acetate, vinylidene acetate, acrylonitrile, methylacrylate, methyl methacrylate and the like.

Example 2

A one-gallon porcelain pebble mill is charged with 648 grams of acetone, 72 grams of xylol and 720 grams of water, resulting in a liquid grinding medium composed of 50% water, 45% acetone, a water-miscible solvent, and 5% xylol, a water-immiscible solvent. These constituents of the liquid grinding medium are mixed thoroughly and to the mixture is added 360 grams of indanthrene blue (C. I. 1113) and 360 grams of a powdered copolymer of vinyl acetate and vinyl chloride, such as is marketed by Union Carbide and Carbon Corporation under the trade name Vinylite VYHH. About 7 lbs. of #00 French flint pebbles are added. After milling for 16 hours, the mill is discharged and rinsed out with water. The product and wash liquid are collected and filtered. The filter cake is then washed, dried and pulverized. One obtains 700 grams of a bright blue, fine, soft powder.

Example 3

A one-gallon porcelain pebble mill is charged with 50 grams of fine particle-size carbon black, such as a good grade of channel black, 780 grams of water, 520 grams of acetone, a water-miscible solvent, and 200 grams of monochlor benzene, a water-immiscible solvent, resulting in a liquid grinding medium composed of 52% water, 34⅔% acetone and 13⅓% monochlor benzene. This is mixed well and to the mixture is added 200 grams of powdered polyacrylonitrile, such as that marketed by Du Pont under the trade name Orlon. About 7 lbs. of #00 French flint pebbles are added. After milling for about 16 hours, the mill is discharged and rinsed out with water. The product and wash liquid are collected and filtered. The filter cake is washed, dried and pulverized. One obtains 247 grams of a plastic color master batch in the form of a soft, dry powder characterized by extreme intensity of color indicating a uniformly high degree of dispersion of the pigment in the plastic.

Example 4

A one-gallon porcelain pebble mill is charged with 100 grams of phthalocyanine blue (a beta copper phthalocyanine) and a liquid grinding medium composed of 540 grams of water, 810 grams of acetone, and 100 grams of monochlor benzene which has been previously made into a homogeneous liquid. This is mixed well and to the mixture is added 200 grams of the powdered copolymer of acrylonitrile and vinyl acetate, such as that marketed by Chemstrand Corporation under the trade name Acrilan. About 7 lbs. of #00 French flint pebbles are added. After milling for about 16 hours, the mill is discharged and rinsed out with water. The product and wash liquid are collected and filtered. The filter cake is then washed, dried and pulverized. One obtains about 295 grams of a fine, bright blue powder.

Example 5

In the process of the preceding Example 4, finely divided carbon black was substituted for the phthalocyanine blue, and to the liquid grinding medium was added 200 grams of 80% acetic acid, as a buffer or neutralizer. All other ingredients and processing steps were the same as recited in Example 4. There was produced about 296 grams of a fine, jet black free-flowing powder.

Example 6

A one-gallon porcelain pebble mill is charged with a liquid grinding medium consisting of 655 grams of water, 800 grams of acetone, a water-miscible solvent, and 48 grams of monochlor benzene, a water-immiscible solvent. The constituents of the liquid grinding medium are thoroughly mixed, the monochlor benzene being dispersed throughout the liquid grinding medium. To this mixture is added 120 grams of carbon black and 120 grams of cellulose acetate. About 7 lbs. of #00 French flint pebbles are added. After milling for about 16 hours, the mill is discharged and rinsed out with water. The product and rinse water are collected and filtered. The filter cake is then washed, dried and pulverized. One obtains about 235 grams of a fine black powder.

Example 7

A one-gallon porcelain pebble mill is charged with a liquid grinding medium consisting of 625 grams of water, 417 grams of acetone, a water-miscible solvent, and 50 grams of xylol, a water-immiscible solvent. The constituents of the liquid grinding medium are thoroughly mixed, the xylol being dispersed throughout the liquid grinding medium. To this mixture is added 250 grams of phthalocyanine green and 250 grams of ethyl cellulose N/10. About 7 lbs. of #00 French flint pebbles are added. After milling for 40 hours, the mill is discharged and rinsed out with water. The product and rinse water are collected and filtered. The filter cake is then washed, dried and pulverised. One obtains about 482 grams of a fine, soft, bright green powder.

It is to be understood that the above examples are illustrative only, and that for the solid organic plastics of these examples may be substituted any substantially water-insoluble solid organic resin plastic, including those disclosed in vol. 5, ch. 1 of Mattiello, above identified, such as natural and modified natural resins, rosin and modified rosin resins, cellulose resins, alkyd resins, aldehyde condensation products, vinyl resins, hydrocarbon resins, and natural and synthetic waxes. Similarly, for the pigments of these examples may be substituted any of the solid colorants normally used in the industry, such as those disclosed in vol. 2, ch. 1 of Mattiello and in the Color Index, both more fully identified above. Further, it is within the purview of this invention to substitute in the liquid grinding media of the above examples other water-miscible and water-immiscible solvents, and other proportions of the constituents, provided that in any such substitutions, the properties and proportions of the constituents of the liquid grinding medium for any plastic are to be determined by the test procedure fully set out in a preceding portion of this specification, or by making test runs under actual conditions of milling.

It is here pointed out that one may in the practice of this invention make pigmented plastic color batches with two or more pigments, in lieu of the single pigment of the above examples, and/or with two or more plastics rather than a single plastic as in the above examples, in order to obtain desired properties in the pigmented plastic not obtainable with a single pigment and/or a single plastic. Further, two or more water-miscible solvents and/or two or more water-immiscible solvents may be constituents of the liquid grinding medium, provided the resulting liquid grinding medium meets the standards set up in the preliminary test procedure, hereinabove described.

It is in some cases advantageous to use additional materials in the milling operation to overcome certain difficulties inherent in the solids being milled, whether in the plastic or in the pigment. Thus, where the solids are acid or alkaline to such an extent that the acidity or alkalinity, as the case may be, might adversely affect the quality of the final product, or might seriously corrode the milling equipment, one may overcome such a difficulty by adding suitable buffering or neutralizing agents which are preferably water soluble and thus being capable of being easily removed from the end product during the washing operations.

The amount of liquid grinding medium employed in the process is selected to provide a consistency suitable for optimum milling operation. As can be seen, wide variation in the amount of liquid used is possible, depending upon the amount of solids to be milled, the type of milling desired and the types of solid organic plastic and solid pigment to be mixed. Thus, with regard to the milling of solid pigments with cellulose derivatives, for example, the weight ratio of solids to liquid will involve 1 part of solids to about 3 to 10 parts of liquid grinding medium.

The amount of pigment used in the process, and therefore being present in the final composition, may vary from as little as about 1% to as high as approximately 95% by weight, depending on the end use. For most purposes, however, a range of approximately 30–70% pigment is preferred.

The terms color "value," or "chromaticity" as used hereinabove or in the claims are terms well known in the art and are employed substantially as described and discussed in "Handbook of Colorimetry" by A. C. Hardy, published by the Technology Press.

What is claimed is:
1. A process of dispersing pigment in solid organic plastic which comprises milling the pigment and plastic for a substantial period of time in a liquid grinding medium comprising water, a liquid organic water-miscible solvent in which the plastic is at least partially soluble and a liquid organic water-immiscible solvent in which the plastic is at least partially soluble, the water and the solvents being thoroughly admixed and being present in the liquid grinding medium in such proportions that the liquid grinding medium does not dissolve a substantial amount of the plastic and does not cause substantial agglomeration of the plastic, the liquid grinding medium being present at all times in such amounts as to give a fluidity to the mixture which permits effective milling action, continuing the milling operation until a dispersion of pigment in plastic is obtained, and thereafter separating the solid portion from the liquid portion of the milled mixture.

2. The process of claim 1 wherein the solid organic plastic is a material selected from a class consisting of natural resins, cellulose resins, vinyl resins, alkyd resins, and waxes.

3. The process of claim 1 wherein the solid organic plastic is a polymer of acrylonitrile.

4. The process of claim 1 wherein the solid organic plastic is a copolymer of acrylonitrile and another vinyl monomer.

5. The process of claim 1 wherein the solid organic plastic is a polymer of vinyl chloride.

6. The process of claim 1 wherein the solid organic plastic is a copolymer of vinyl chloride and another vinyl monomer.

7. The process of claim 1 in which the liquid organic water-miscible solvent is acetone.

8. The process of claim 1 in which the liquid organic water-immiscible solvent is monochlorbenzene.

9. The process of claim 1 in which the liquid organic water-miscible solvent is acetone and the liquid organic water-immiscible solvent is monochlorbenzene.

References Cited in the file of this patent

UNITED STATES PATENTS

| | | |
|---|---|---|
| 2,238,956 | Strother | Apr. 22, 1941 |
| 2,296,427 | Daniel et al. | Sept. 22, 1942 |

OTHER REFERENCES

Hackh's Chemical Dictionary (3rd ed.), Grant (1944), page 895.